United States Patent Office 3,502,546
Patented Mar. 24, 1970

3,502,546
CULTURE AND DIAGNOSTIC METHOD FOR TREPONEMA PALLIDUM ORGANISMS
Kenneth Wade Thompson, Waunakee, Wis., and Richard Thompson Price, Verona, Rita Cecelia Prodell, East Orange, and Matilda Martha Sipsey, Morristown, N.J., assignors to Organon, Inc., West Orange, N.J., a corporation of New Jersey
No Drawing. Filed Dec. 27, 1966, Ser. No. 604,570
Int. Cl. C12k 3/00
U.S. Cl. 195—96       2 Claims

ABSTRACT OF THE DISCLOSURE

Spirochaetal organisms, such as Treponema pallidum, are cultured in either batch or continuous culture in a cell culture type medium, under controlled oxygen concentrations, and especially in the presence of bacteria of the family Bacillaceae. The antigen formed in the culture is adsorbed on a finely divided solid carrier to provide a diagnostic reagent for syphilis.

BACKGROUND OF THE INVENTION

The genera Spirochaeta and Treponema are generally regarded as forms of microorganisms intermediate between bacteria and protozoa, partaking of the character of both. One of the most important members of this group is Treponema pallidum, the specific cause of syphilis. Methods for culturing Treponemo pallidum have been described in the literature as far back as the work of Noguchi (1911) who described inoculation of agar slants with infected material at substantial depths below the surface. Growth of the organism under these conditions has been considered to be favored by a low level of oxygen concentration. The early culture methods were unsuitable for continuous operation, and there is doubt, moreover, that they actually involved those Treponema pallidum strains which produce syphilis in humans. In U.S. Patents 2,513,327 and 2,709,670 there is disclosed the use of a medium comprising a major portion of human blood and a minor portion of hog blood for culturing Treponemo pallidum, and the employment of this culture in an agglutination test with serum from a person suspected of having syphilis, but this technique does not appear to have won acceptance as a diagnostic method.

A human pathogenic strain of the organism has been cultured in rabbit testicle and is known as rabbit-adapted Treponema pallidum, Nichols variety. It is regarded as equivalent to the human pathogenic species, and can be identified by isolating from the culture the strain-specific antigen and reacting it with specific Nichols strain antibody. The identification can be further confirmed by means of the so-called Treponema fluorescence antibody test.

Prior to the present invention, there has not been available a dependable method for culturing Treponema pallidum organisms in vitro, and to obtain therefrom killed organisms or extracts suitable for immunochemical test methods. This would provide to physicians and health agencies a diagnostic test which could be performed rapidly and with a minimum of equipment to detect the presence of the human pathogenic strain of this organism.

SUMMARY OF THE INVENTION

In accordance with the present invention, it was found that Spirochaetal organisms can be cultured successfully in both batch and continuous culture in a cell culture type medium, under controlled oxygen concentrations, and especially in the presence of bacteria of the family Bacillaceae.

In the genus Spirochaeta, the cell is usually an exceedingly slender, flattened, spiral body, with a membrane surrounding the entire body, no flagella are produced. In the genus Treponema, the body is spiral and wire-like, and tapers at each end into a slender filament. Treponema pallidum itself is an exceedingly slender organism less than 0.5 micron in diameter and usually about 4–20 micron in length. It is spiral shape and motile and has an outer coating. Under certain conditions the spiral shape is distorted and the body is condensed into masses, some of which are spheres. Thus, certain conditions promote development of nonspiral, spore-like forms.

The life cycle of Treponema pallidum is characterized by the development of two distinct forms of the organism. The typical spiral vegetative form, which doubtless represents the invasive stage, has the familiar long, thin spiral shape, having smooth edges, uniform spacing of coils of about 7–14 turns and tapered thin ends. The organism usually divides when its length attains about 15 turns, but under quiet culture conditions as many as 70 turns have been noted. The typical coiled spiral organism develops beads, usually at one or both ends, or beads may appear at one or more spirals. The entire length of the organism may break up into a series of slightly swollen clumps, the smallest having a diameter about equal to the cross-section of the original spiral. These beads or condensates called by some others gemma, after breaking up float free in the culture medium, each ready to mature into a vegetative form when conditions are favorable. This development involves formation of a well defined outer coat about the condensate of core material. Within this outer coat the core material increases in amount. This core material then projects from the sphere and develops to the short and then the long spiral vegetative form.

DESCRIPTION OF THE PREFERRED EMBODIMENTS

In accordance with a first aspect of the invention, it was found that Spirochetes and Treponema may be successfully grown in a cell culture medium, modified and enriched with selected amino acids and vitamins. A culture medium found suitable for the purposes of the invention when modified and supplemented as indicated, is a minimum essential medium for suspended cultures described by Eagle, Science, vol. 130, pp. 432–437 (1959) or medium described in U.S. Patent 3,065,156 K. W. Thompson, et al. Nov. 20, 1962. Typical composition for a suitable culture medium, which is to be considered as illustrative but not as limiting, is as follows:

Ingredients dissolved and diluted to one liter with glass distilled water:

Sodium chloride—5.49 gm.
Potassium chloride—0.4 gm.
Magnesium chloride hexahydrate—0.177 gm.
Calcium chloride dihydrate—0.0232 gm.
Dextrose—1.75 gm.
Sodium pyruvate—0.11 gm.
1-cystine—0.06 gm.
1-glutamic acid—0.063 gm.
1-methonine—0.009 gm.
1-histidine—0.0168 gm.
1-serine—0.021 gm.
1-arginine—0.632 gm.
1-glutamine—0.300 gm.
Ferric chloride $6H_2O$—0.541 mg.
Zinc sulfate $7H_2O$—0.863 mg.
Cobalt chloride $6H_2O$—0.048 mg.
Manganese chloride $4H_2O$—0.099 mg.
Cupric sulfate $5H_2O$—0.1 mg.
Riboflavin—0.2 mg.
Biotin—2.0 mg.
Folic acid—2.0 mg.

di-α-Lipoic acid—1.0 mg.
Thiamine hydrochlroide—2.0 mg.
Choline chloride—2.0 mg.
Pyridoxal hydrochloride—2.0 mg.
Cyanocobalamine—0.4 mg.
i-Inositol—2.16 mg.
p-Aminobenzoic acid—0.125 mg.
Niacinamide—2.0 mg.
Calcium pantothenate—2.0 mg.
Ascorbic acid—20.0 mg.
Vitamin A alcoholic—0.25 mg.
Vitamin D crystalline—0.25 mg.
di-α-Tocopherol—0.025 mg.
Vitamin K—2.0 mg.
Phenol red (when used)—10.0 mg.
0.1 N $H_3PO_4$—7.2 ml.

The foregoing is supplemented with 2 grams/liter of a yeast hydrolysate containing various amino acids in trace amounts including aspartic acid, threonine, serine, glutamic acid, proline, glycine, alanine, cystine, valine, methionine, isoleucine, leucine, tyrosine, phenylalanine, lysine, histidine HCl, tryptophane, arginine, as well as other identifiable yeast factors.

During preparation, this culture medium is equilibrated by bubbling through 100 percent $CO_2$ as 9.2 ml. of 5 N NaOH is slowly added. The final pH is established at 7.2–7.4.

Sterile normal rabbit serum, heat-inactivated, may be added at a 3.5–5 percent concentration before use.

In accordance with a second aspect of the invention, it was found that optimal growth of the organism which is micro-aerophilic, is obtained in an atmosphere in which the concentration and pressure of oxygen is substantially less than that of the atmosphere. For this purpose there is employed an atmosphere of nitrogen and a diminished partial pressure of oxygen as well as a small amount of carbon dioxide to maintain proper pH of the medium.

In accordance with a further aspect of the invention, it was found that the growth of Spirochetes and Treponema organisms may be promoted by the presence in the culture medium of an organism of the family Bacillaceae, the members of which include, for example, *Bacillus subtilis,* as well as *B. megaterium, B. cereus, B. coagulans, B. pumilus, B. macerans,* and *Lactobacillus bulgaricus.* The preferred organism is a strain of *B. subtilis,* an organism widely distributed in soil and decomposing organic matter and which has been isolated from infusions of hay. These bacilli are aerobic, spore-forming, and able to decompose protein under aerobic conditions. In the case of *B. subtilis,* optimum growth temperature lies between 28° C. and 40° C., and sometimes as high as 55° C., antibiotics are produced such as subtilin and bacillin, and an enzyme, subtilism. *B. subtilis* is noted for its avidity for oxygen and its ability to reduce nitrates to to release ammonia.

The joint growth of Treponema and *B. subtilis* appears to represent a form of symbiosis characterized as commensalism, in which only one member benefits, although it may also be considered as parasitism, the Treponema acting as parasite, and the *B. subtilis* as host organism. It has been observed that the Treponema emerges from the relationship as a healthy culture. Nevertheless, in the joint culture, the host does not appear to be curtailed by the growth or presence of the Treponema, although the medium may become depleted for the *B. subtilis,* forcing it to regress while the Treponema progresses in growth. Growth of *Treponema pallidum,* however, does not occur in conventional bacterial culture media, such as will support *B. subtilis* alone, for example, peptone broth or thioglycollate medium.

The joint Treponema-*B. subtilis* cultures are found to be vigorous and healthy in appearance, with excellent spirals, with more Treponema per high power field (×400) than can be counted, and with *B. subtilis* in rapid multiplication as well. It is believed that the *B. subtilis* aids in providing the optimum range of oxygen concentration and pressure. The optimal growth temperature occurs at about 37° C. but temperature variations do not have a deleterious effect.

Long term cultures of *Treponema pallidum* not containing the *B. subtilis* may serve as seed cultures. They show only a few imperfect spiral organisms, and very many refractile Treponemal condensates of varying size. When *B. subtilis* is added to such a seed culture, very numerous spiral Treponema are seen on about the fourth day. Of these four days, the first one or two are required for *B. subtilis* to develop its own growth so as to provide optimal conditions after which the Treponema condensates progress to maturity.

It is within contemplation of the invention to grow the specific human pathogenic strain of *Treponema pallidum* typified by the Nichols rabbit adapted strain of the organism, and to prepare from growing cultures (a) live or killed organisms with characteristic antigenic properties and/or (b) extracts of these organisms and antigens. Such organisms or extracts can then be used for diagnostic test for syphilis vaccine production, or other purposes.

In accordance with the methods of the invention, the Treponema organisms have been grown and propagated in two forms. Using the special medium previously described, the organisms have been grown in seed culture form, characteristically granules and condensates, and in the presence of a bacillus of the family Bacillaceae as spiral forms. It is believed that where the bacillus is employed in joint culture, it contributes to the growth of the Treponema in two ways: (a) by achieving proper conditions by lowering oxygen tension, and (b) contributing metabolites which produce correct pH or which add some nutrient.

In order to prepare test reagents suitable for the detection of syphilis, the antigens obtained from the Treponema cultures are coupled to or adsorbed on particles of an inert finely divided carrier, so as to make the reaction between antigen and antibody visible by a clumping together or agglutination of the particles. As carrier there may be employed erythrocytes, bentonite, clays, collodium, cholesterol crystals, glass particles and synthetic resins and latices. Preferably there is used a synthetic latex, for example, polystyrene latex, owing to its constancy of physiochemical properties. The following examples serve to illustrate conjoint growth with *Treponema pallidum,* but it will be understood that these choices are for purposes of illustration only, and are not to be considered as limiting.

EXAMPLE 1

Growth of T. pallium in culture medium

A rabbit was testicularly infected with *Treponema pallidum,* Nichols strain. On or about the 10th day, when the infection was at its peak, the testicle was removed, minced in a small amount of base medium not containing serum, the mince stirred and pieces of tissue separated manually. The remaining coarse suspension, including live Treponema was used as the inoculum for a suitable quantity of the special culture medium previously described which was prepared and sterilized, and 5 percent heat-inactivated rabbit serum added. The organism is grown in either stationary or in spinner culture at atmospheric pressure in a closed system in an atmosphere of 95 percent nitrogen and 5 percent carbon dioxide, by volume, and allowed to grow for 4 days to 7 days. Feeding was performed every 4 to 7 days by withdrawing about 50 percent of the culture and replacing with fresh medium. The temperature was maintained at 37° C. After an initial lag, the number of organisms increased, as indicated by microscopic field count. At a suitable point in continuous culture, the organisms, which are antigenic, can be recovered either in their whole killed state, by addition of a preservative, such as formalin or glutaraldehyde, after separation by centrifugation, or they can be fragmented by ultrasonic vibration, or by freezing and thawing, to release cell contents, and extracted by a selective solvent followed by precipitation with precipitants such as alcohol-acetone.

In either way there is obtained an antigen for *Treponema pallidum*, for diagnostic or other purposes.

EXAMPLE 2

Following the procedure of Example 1, the sterilized culture medium is prepared, and an inoculum of *B. subtilis* added simultaneously with the inoculum of *Treponema*. The *B. sultilis* can be derived from an actively growing culture, and can also be added in spore form. If desired, the *B. subtilis* can be added later, e.g., after 24 hours growth of the Treponema. The joint culture is carried out by continuous culture methods, supplying fresh medium at appropriate times.

EXAMPLE 3

Treponena antigen, obtained as described in Example 1 or 2, is used to sensitize polystyrene latex particles (Dow Chemical Company Bioproducts Department). Latex particles ranging in size from an average of 0.15 micron to particles averaging 1.5 microns are washed in a suitable buffer, such as an 0.14 M borate buffer at pH 8.3, then the surface of the latex particles is treated in such a way as to alter the amount of availability of adsorption sites by exposure to and incubation with a predetermined quantity of inert protein. Any protein excess is removed by centrifugation and washing of the treated latex particles. They are then incubated with an optimal amount of Treponema antigen. After incubation the sensitized particles are washed and the Treponemal antigen fixed on to the particle by heating the suspended sensitized latex particles in a water bath at temperature ranging from 25° C. to 100° C.

The sensitized particles can now be used as a highly specific indicator for Treponemal antibodies in human serum. One drop of serum, with or without prior dilution, from an individual having syphilis and therefore containing antibodies to *Treponema pallidum* is placed on a glass slide. One drop of the sensitized latex particle suspension is added and mixed. An interaction between the antibodies in the serum and the antigen on the particle is made visible by a microscopically discernible agglutination of the particles.

What is claimed is:
1. Method for the production of a *Treponema pallidum* antigen comprising the steps of:
   (a) innoculating a sterilized mammalian cell culture medium supplemented with an effective amount of yeast hydrolysate with *Treponema pallidum* organisms and with *Bacillus subtilis*;
   (b) jointly growing said organisms in said medium in an atmosphere in which the concentration and pressure of oxygen are substantially less than atmospheric, the pH of the medium being maintained between about 7.2 and about 7.4;
   (c) recovering said organisms from the culture medium; and
   (d) separating the *Treponema pallidum* organisms and contained antigen.
2. The method of claim 1 in which the Treponema is *Treponema pallidum* Nichols strain.

References Cited

UNITED STATES PATENTS

| | | | |
|---|---|---|---|
| 2,255,079 | 9/1941 | Morrison | 195—96 |
| 2,513,327 | 7/1950 | Ichelson | 195—100 |
| 3,186,917 | 6/1965 | Gerhardt et al. | 195—111 |

OTHER REFERENCES

Steinman et al., J. Bact., vol. 64, pp. 265–269 (1952), vol. 67, pp. 597–602 (1954).

Eagle, Science, vol. 130, pp. 432–437 (1959).

ALVIN E. TANENHOLTZ, Primary Examiner

U.S. Cl. X.R.

195—100, 109, 111; 424—13